(12) United States Patent
Daoud

(10) Patent No.: US 6,195,496 B1
(45) Date of Patent: Feb. 27, 2001

(54) SPLICE HOLDER WITH TILTED MOUNTING FEATURE

(75) Inventor: Bassel Hage Daoud, Parsippany, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/364,814

(22) Filed: Jul. 30, 1999

(51) Int. Cl.$^7$ ........................................................ G02B 6/00
(52) U.S. Cl. ......................... 385/137; 385/134; 385/136; 385/95; 385/98
(58) Field of Search .................... 385/60, 76, 95, 385/98, 96, 134–137; 174/92; 439/404; 428/34.5

(56) References Cited

U.S. PATENT DOCUMENTS

| | | | |
|---|---|---|---|
| 5,530,786 | * 6/1996 | Radliff et al. | 385/136 |
| 5,566,268 | * 10/1996 | Radliff et al. | 385/137 |
| 5,566,269 | * 10/1996 | Eberle, Jr. et al. | 385/137 |

* cited by examiner

Primary Examiner—Phan T. H. Palmer
(74) Attorney, Agent, or Firm—Howard C. Miskin; Gloria Tsui-Yip

(57) ABSTRACT

A splice holder for securing and retaining fiber optic splices. The splice holder accommodates a higher density of splices than prior art splice holders, improves access to individual splices and minimizes interference to adjacent splices during removal. The splice holder comprises a plurality of parallel, spaced apart longitudinal members extending from a base. Adjacent pair of members define a channel for retaining a splice. Each channel is tilted having its longitudinal axis at an acute angle relative to the plane of the base such that a splice placed along a channel has one raised end further away from the bottom mounting surface of the base than the opposite end closer to the bottom mounting surface. The plurality of channels are alternatively tilted such that the channels are staggered at the front and rear edges of the base to facilitate access to the raised end of a splice without interfering with adjacent splices closer to the bottom mounting surface of the base.

11 Claims, 4 Drawing Sheets

SPLICE HOLDER WITH TILTED MOUNTING FEATURE

FIELD OF THE INVENTION

The invention relates to a device for securing and retaining fiber optic splices which accommodates a high density of splices, facilitates access to individual splices and minimizes interference with adjacent splices during removal of an individual splice.

BACKGROUND OF THE INVENTION

Telecommunications utilizing fiber optic technology improves the quality of communications and can handle a higher volume of voice and data transfer than similar sized copper electrical wiring and cables. To provide interconnections between widely separated points, splicing is required to join cables and wires. For example, splices are used commonly, in part, to interconnect subscribers to a telecommunication provider, such as a telephone service provider.

Two common types of fiber optic splices are the single fusion splice and the mass fusion splice, both generally known in the art of fiber optic technology. Single fusion splices have a smaller cross-sectional area and are longer in length than mass fusion splices. Due to the need to maintain the quality of transmission over the spliced connection, splices are secured in some manner, such as in a splice holder, to prevent undesired agitation, strain and/or damage. A splice holder also organizes and arranges the splices to facilitate identification and servicing by a technician whenever required. Splice holders are typically made of a foam material and placed on a fiber optic tray forming part of a distribution panel, usually located in a basement of a subscriber.

A prior art single fusion splice holder may be further described with reference to FIG. 1. FIG. 1 shows a splice holder 10 comprising nine parallel, spaced apart members $11_1 \ldots 11_9$ extending upwardly from an integral base 12. Each adjacent pair of members, such as $11_1$–$11_2$, defines a channel 13 therebetween having a constricted neck 14 for retaining and securing a corresponding splice. Each channel 13 has a cross-sectional area corresponding to that of a corresponding splice for frictional hold. Each constricted neck 14 has a width slightly narrower than the width of a corresponding splice for additional frictional hold and prevents inadvertent dislodgment.

Splice holder 10 typically further comprises a plastic housing (not shown) for mounting the base 12 to provide further structural support to splice holder 10. Splice holder 10 is flat, with each channel 13 being on a plane parallel to base 12 and near the bottom mounting surface 15 of splice holder. Having channels 13 on the same plane prevent them from being closely adjacent each other without altering the holding resiliency and structural integrity of members 11. The position of channels 13 near the bottom mounting surface 15 limit access to the underside 16 of a splice 17 for its removal. Furthermore, removal of one splice may interfere with and cause dislodgment of closely positioned adjacent splices.

Therefore, there is a need for an improved splice holder for securing a higher density of splices that facilitates access to individual splices and minimizes interference to neighboring splices during removal of the individual splice.

SUMMARY OF THE INVENTION

The invention provides a holder for securing and retaining fiber optic splices. The improved splice holder of the present invention accommodates a higher density of splices than prior art splice holder, improves access to individual splices, when required, and minimizes interference to adjacent splices during its removal.

The splice holder of this invention comprises a base having at least one set of a plurality of parallel, spaced apart, longitudinal extending members. Each adjacent pair of members defines a channel therebetween, extending from a transverse front surface to a transverse rear surface of the members, for situating and retaining a splice. The base has front and rear edges, with the front surface of a member adjacent the front edge and with the rear surface of a member adjacent the rear edge. Each channel has a cross-sectional area corresponding to that of a splice to provide frictional hold. Each channel also has a constricted neck dimensioned to be slightly narrower than the width of a splice for additional frictional hold and prevents accidental dislodgment of the splice.

Each channel defines a longitudinal axis that is tilted at an acute angle with respect to the plane of the base such that a splice placed along a channel has one end farther away from the base than the opposite end. The plurality of adjacent channels are tilted in alternating directions relative to the plane of the base and each other so that at the front edge of the base, the ends of one set of alternating angled channels are at a greater distance from the base than adjacent channels and hence have shorter constricted necks, while at the rear edge of the base, these alternating channels are closer to the base and hence have longer constricted necks. Alternating longer and shorter constricted necks at the front and rear edges, respectively, of the base allows adjacent channels to be staggered and placed closely adjacent each other without detrimentally interfering with the resiliency or structural integrity of the members. In addition, every splice placed along the channels advantageously has one end positioned further away from the base than the opposite end to provide more room for accessing the underside of the splice for removal and with minimal interference to displacement of adjacent splices having the same end positioned closer to the base.

It will be appreciated that, for purposes of illustration, these figures are not necessarily drawn to scale.

DETAILED DESCRIPTION OF THE PREFERRED EMBODIMENTS

Figure 1:
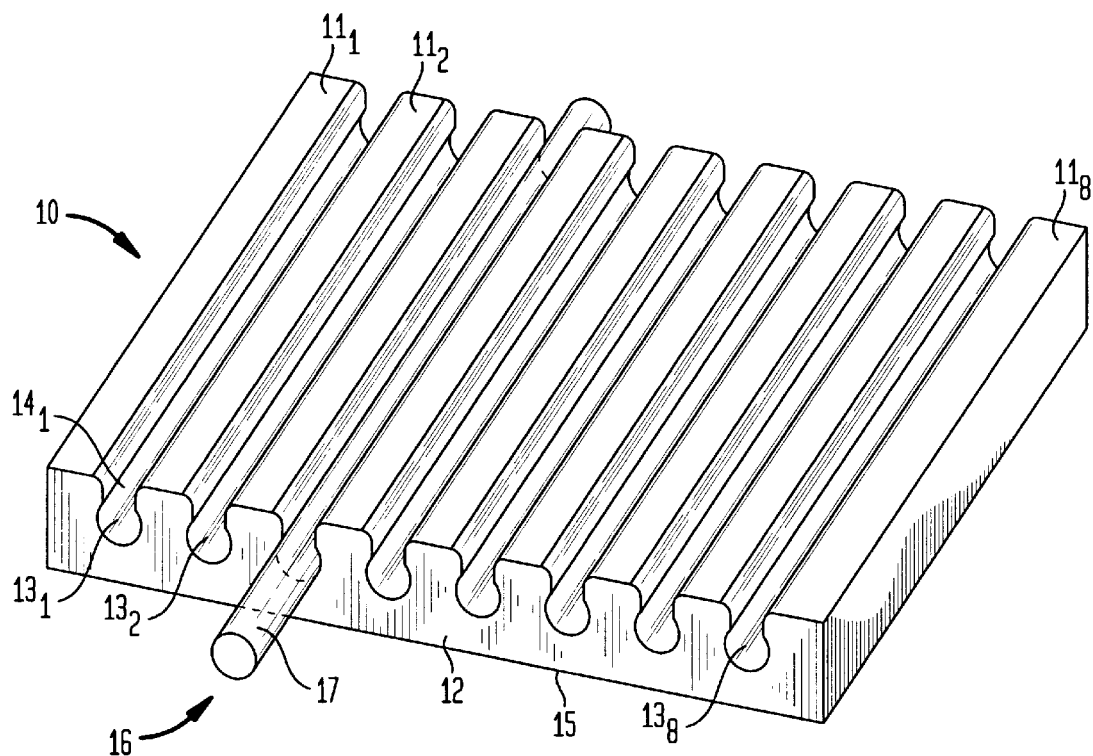
FIG. 1 is a perspective view of a prior art splice holder.
Figure 2:
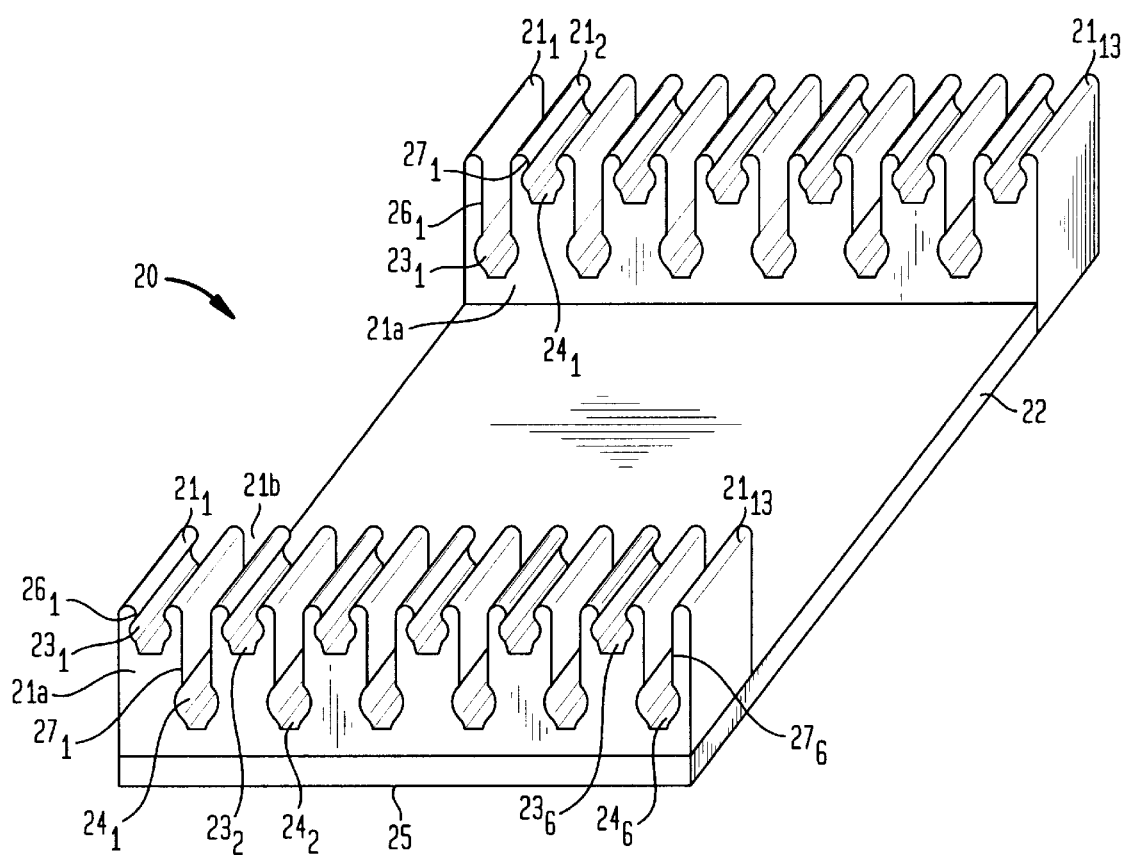
FIG. 2 is a perspective view of the splice holder of the present invention.

With reference to the drawings, wherein the same reference number indicates the same element throughout, there is shown in FIG. 2 a splice holder 20 of the present invention.

Figure 5:
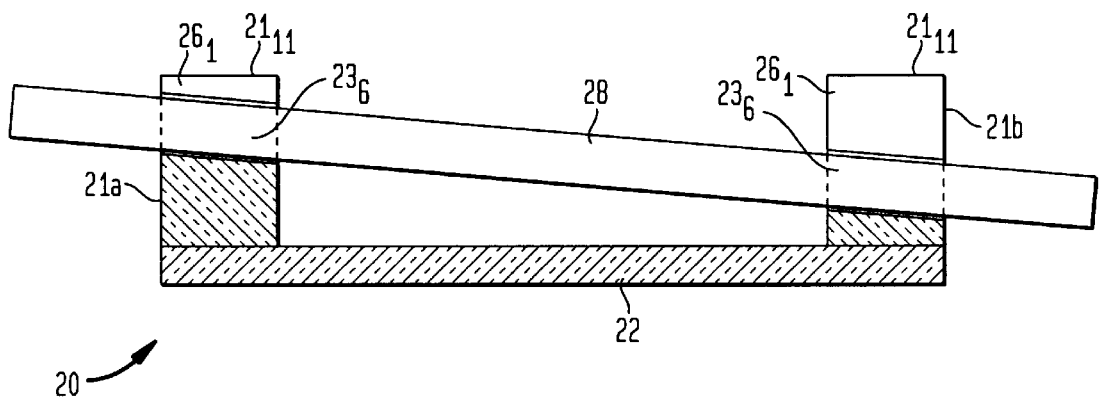
FIG. 5 is a cross-sectional view of the splice holder of the present invention taken along line 5—5 in FIG. 4, illustrating the position of a splice at one angle.
Figure 6:
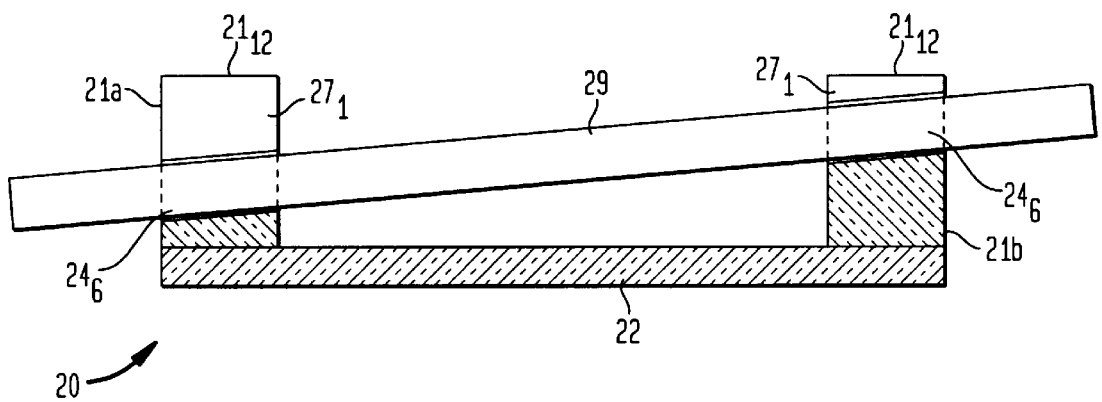
FIG. 6 is a-cross-sectional view of the splice holder of the present invention taken along line 6—6 in FIG. 4, illustrating the position of an alternating splice at another angle.

As shown in FIG. 2, splice holder 20 comprises two sets of parallel, spaced apart longitudinal members $21_1 \ldots 21_{13}$ extending upwardly from a base 22. The two sets of members 21 are at the front and rear edges, respectively, of base 22 (best shown in FIG. 3). Each adjacent pair of members, such as $21_1$–$21_2$, defines a channel $23_1, \ldots 23_6, 24_1 \ldots 24_6$ therebetween, extending from the front surface 21a to the rear surface 21b of members 21, for situating and retaining a splice 28 or 29 (as shown in FIGS. 5 and 6). The front surface 21a of one set of members is adjacent to the front edge of base 22 and the rear surface 21b of the second set of members is adjacent the rear edge of base 22. Splice holder 20 typically further comprises a plastic housing (not shown) for mounting the mounting surface 25 of the base 22 to provide further structural support to splice holder 20.

Figure 3:
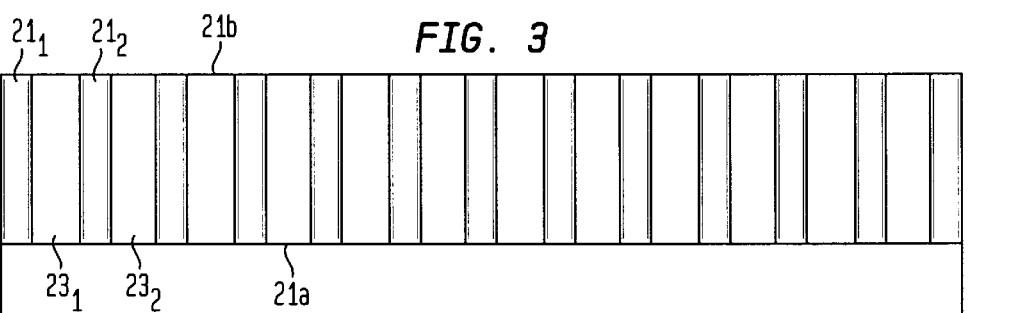
FIG. 3 is the top plan view of the splice holder of the present invention.

As shown in FIG. 3, corresponding channels such as $23_1$–$23_1$, of the two sets of members 21 are in longitudinal axial alignment and cooperatively secure two ends of a splice 28 or 29 (as shown in FIGS. 5 and 6). Although two sets of members 21 are shown in FIG. 2, more or less sets of members 21 on base 22 can serve to secure and retain the splices.

Figure 4:
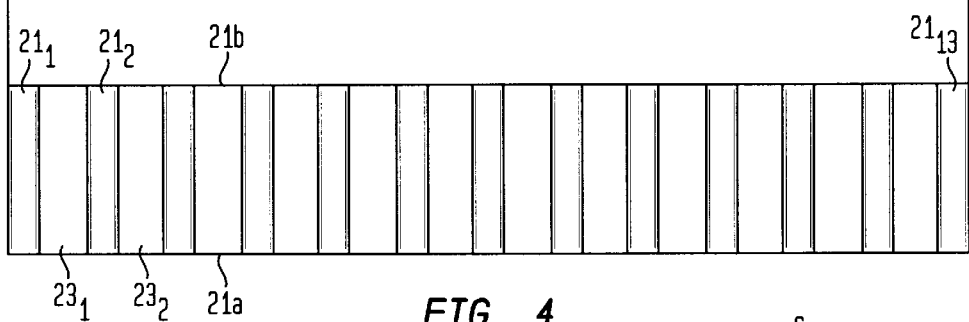
FIG. 4 is the front elevational view of the splice holder of the present invention
Figure 4:
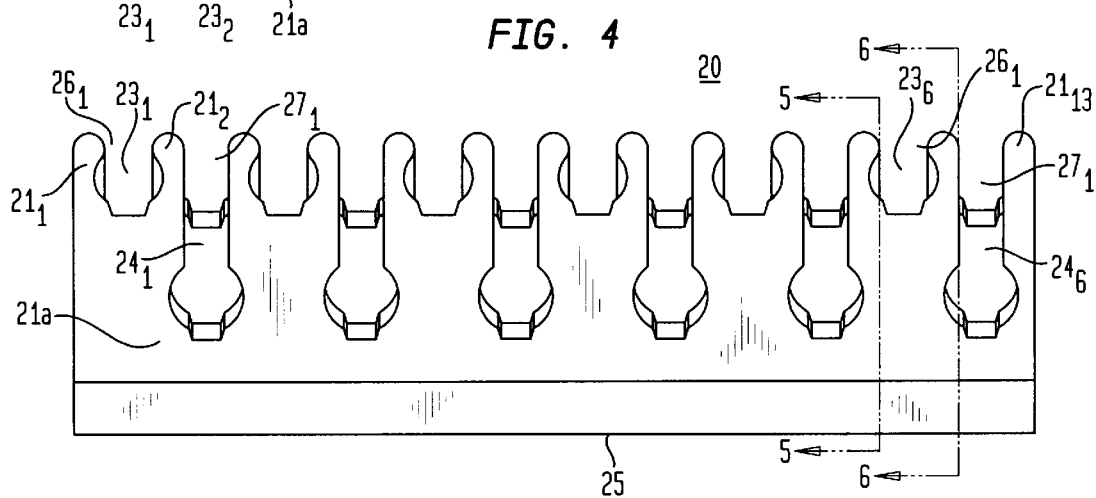

FIG. 4 shows that each channel 23 and 24 has a cross-sectional area generally corresponding to that of a splice to be held therein for frictional hold. For additional frictional hold and to prevent accidental dislodgment, each channel 23 and 24 has a constricted neck 26 and 27, respectively, dimensioned to be slightly narrower than the width of the splice. At the front surface of 21a of members 21 adjacent the front edge of base 22, channel 23 has a shorter constricted neck 26 than the constricted neck 27 of channel 24. Thus, at the front surface of 21a of members 21, more room is provided between splice 28 held in channels 23 and the mounting surface of the base 25 than splice 29 held in channels 24 (as shown in FIGS. 5 and 6). Thereby, alternating channels 23 and 24 to provide a staggering of channels to improve access to splice 28 held in channel 23 at the front surface 21a of members 21 at the front edge of base 22 by providing more room between the mounting surface 25 of the base 22 and splice 28 without interfering adjacent splices 29 held in adjacent channels 24 at a position closer to the mounting surface 25 of base 22.

Figure 7:
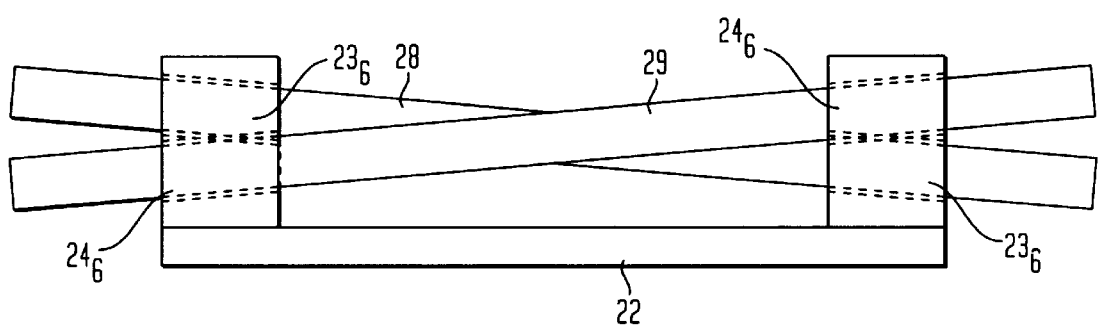
FIG. 7 is a side view of the splice holder of the present invention illustrating alternating splices at two different angles.

In order to provide similar access to splices 29 held in channels 24 at the rear surface 21b of the second set of members 21 adjacent rear edge of base 22, channels 23 and 24 are alternatively tilted at an acute angle relative to the plane of the base 22 (as shown in FIGS. 5 and 6). As shown in FIG. 7, splices 28 and 29 held in channels 23 and 24, respectively, intersect against each other and are criss-crossed. Each channel 23 and 24 is further away from the mounting surface 25 of base 22 at the front edge of base 22 on the front surface 21a of the first set of members 21 and at the rear edge of base 22 on the rear surface 21b of the second set of members 21, respectively. Therefore, each splice 28 and 29 held in channels 23 and 24 has one end further away from the mounting surface 25 of base 22 and one end closer to the mounting surface 25 of base 22.

The degree of the angles of the channels 23 and 24 relative to the base 22 can vary anywhere between zero degree to ninety degrees, as desired or as the needs required. Furthermore, additional sets of channels having different and varying degrees from channels 23 and 24 can be used. The plurality of members 21 can be made of a foam, rubber or polyethylene material to provide resiliency in holding splices therebetween.

Although certain features of the invention have been illustrated and described herein, other better modifications and changes will occur to those skilled in the art. It is, therefore, to be understood that the appended claims are intended to cover all such modification and changes that fall within the spirit of the invention.

What I claim is:

1. A device for securing and retaining at least two fiber optic splices comprising:

a base having front and rear edges and defining a plane;

at least one set of at least three generally parallel, spaced apart members extending longitudinally from said base;

each adjacent pair of said members defining a channel therebetween for retaining one of said splices;

a first set of channels being tilted with each corresponding channel having its longitudinal axis at an acute angle to said plane of said base;

a second set of channels being tilted with each corresponding channel having its longitudinal axis at an acute angle to said plane of said base;

said axis of said first set of channels being closer to said base at said rear edge than at said front edge; and said axis of said second set of channels being closer to said base at said front edge than at said rear edge.

2. The device according to claim 1 said channels being alternating with said first set and said second set of channels.

3. The device according to claim 2 wherein each of said set of members having a front surface and a rear surface, said base further having a mounting surface, said first set of channels at said front surface being further away from said mounting surface of said base than at said rear surface and said second set of channels at said front surface being closer to said mounting surface of said base than at said rear surface.

4. The device according to claim 3 wherein said splices having corresponding cross-sectional areas, wherein each of said channels having a cross-sectional area generally corresponding to said cross-sectional areas of said corresponding splices for frictional hold.

5. The device according to claim 4 wherein said splices further having corresponding cross-sectional widths, wherein each of said channels having a constricted neck dimensioned to be slightly narrower than said width of said corresponding splices for additional frictional hold.

6. The device according to claim 5 wherein said constricted neck of said first set of channels at said front surface of said members being shorter than at said rear surface.

7. The device according to claim 6 wherein said constricted neck of said second set of channels at said front surface of said members being longer than at said rear surface.

8. The device according to claim 7 wherein said first set of channels at said front surface of said members being further away from said mounting surface than said second set of channels for accessing at said front surface said splices retained in said first set of channels without interfering with said splices retained in said second set of channels.

9. The device according to claim 8 having first and second sets of members, wherein said first set of members extending from said front edge and said second set of members extending from said rear edge such that said front surface of said first set of members being adjacent said front edge and said rear surface of said second set of members being adjacent said rear edge and each channel from said first set of members is in longitudinal axial alignment with a corresponding channel from said second set of members to cooperatively secure one of said splice.

10. The device according to claim 9 wherein said first set of channels at said rear surface of said second set of members being closer to said mounting surface of said base than said second set of channels for accessing at said rear surface said splices retained in said second set of channels without interfering with said splices retained in said first set of channels.

11. The device according to claim 8 wherein said first set of channels at said rear surface of said members being closer to said mounting surface of said base than said second set of channels for accessing at said rear surface said splices retained in said second set of channels without interfering with said splices retained in said first set of channels.

\* \* \* \* \*